US008582511B2

(12) United States Patent
Vujcic et al.

(10) Patent No.: US 8,582,511 B2
(45) Date of Patent: Nov. 12, 2013

(54) PROCEDURE FOR INITIAL ACCESS

(75) Inventors: Dragan Vujcic, Limours (FR); Patrick Fischer, Bourg la Reine (FR)

(73) Assignee: LG Electronics Inc., Seoul (KR)

( * ) Notice: Subject to any disclaimer, the term of this patent is extended or adjusted under 35 U.S.C. 154(b) by 85 days.

(21) Appl. No.: 12/304,996

(22) PCT Filed: Jun. 20, 2007

(86) PCT No.: PCT/KR2007/002989
§ 371 (c)(1),
(2), (4) Date: Jul. 10, 2009

(87) PCT Pub. No.: WO2007/148917
PCT Pub. Date: Dec. 27, 2007

(65) Prior Publication Data
US 2009/0290509 A1   Nov. 26, 2009

Related U.S. Application Data

(60) Provisional application No. 60/805,325, filed on Jun. 20, 2006.

(51) Int. Cl.
*H04W 4/00* (2009.01)
*H04W 72/00* (2009.01)
*H04W 74/00* (2009.01)
*H04W 72/12* (2009.01)
*H04W 74/08* (2009.01)

(52) U.S. Cl.
CPC .......... *H04W 74/008* (2013.01); *H04W 74/006* (2013.01); *H04W 74/004* (2013.01); *H04W 74/002* (2013.01); *H04W 72/1289* (2013.01); *H04W 72/1284* (2013.01); *H04W 72/1278* (2013.01); *H04W 74/08* (2013.01)
USPC ........... 370/329; 370/328; 370/461; 370/462; 455/450

(58) Field of Classification Search
CPC ............ H04W 74/008; H04W 74/006; H04W 74/004; H04W 74/002; H04W 74/08; H04W 72/1289; H04W 72/1284; H04W 72/1278
USPC .................. 370/329, 462, 328, 461; 455/450
See application file for complete search history.

(56) References Cited

U.S. PATENT DOCUMENTS

| 6,507,601 | B2 * | 1/2003 | Parsa et al. ..................... 375/141 |
| 2001/0021984 | A1 * | 9/2001 | Kim ................................ 714/18 |
| 2007/0149206 | A1 * | 6/2007 | Wang et al. .................... 455/450 |
| 2007/0206531 | A1 * | 9/2007 | Pajukoski et al. ............. 370/329 |

(Continued)

FOREIGN PATENT DOCUMENTS

WO    WO 2004043099 A2 *  5/2004

OTHER PUBLICATIONS

European Telecommunications Standards Institute (ETSI),"Digital cellular telecommunications system (Phase 2+); Mobile radio interface layer 3 specification", TS 100 940 V6.1.0, Aug. 2008.

(Continued)

*Primary Examiner* — Ayaz Sheikh
*Assistant Examiner* — Tarell Hampton
(74) *Attorney, Agent, or Firm* — Lee, Hong, Degerman, Kang & Waimey

(57) ABSTRACT

A method for accessing a wireless communication network includes transmitting a first message that has a first random identifier (RAND ID), and receiving a response to the first message such that the response includes the first RAND ID and signaling information. The method further includes transmitting a second message, having a second RAND ID, using at least one allocated resource. An alternative method includes communicating with a UE by receiving a first message from the UE. The first message includes a first RAND ID. The method further includes transmitting to the UE a response to the first message, and receiving a second message from the UE on at least one allocated resource. Typically, the response includes the first RAND ID and signaling information, and the second message comprises a second RAND ID.

13 Claims, 8 Drawing Sheets

(56) References Cited

U.S. PATENT DOCUMENTS

2008/0279257 A1* 11/2008 Vujcic et al. .................. 375/132
2011/0165880 A1* 7/2011 Kodikara Patabandi
  et al. ............................ 455/450

OTHER PUBLICATIONS

ETSI, "Digital cellular telecommunications system (Phase 2+); Mobile radio interface layer 3 specification (GSM 04.08 version 6.11.0 Release 1997)," ETSI TS 100 940 V6.11.0, Oct. 2000, XP002694066, 6 pages.

Menezes, et al., "Handbook of Applied Cryptography," 1997, XP002694067, pp. 397-400.

European Patent Office Application Serial No. 07747023.5, Search Report dated Mar. 28, 2013, 6 pages.

* cited by examiner

PROCEDURE FOR INITIAL ACCESS

CROSS-REFERENCE TO RELATED APPLICATIONS

This application is the National Stage filing under 35 U.S.C. 371 of International Application No. PCT/KR2007/002989, filed on Jun. 20, 2007, which claims the benefit of U.S. Provisional Application No. 60/805,325, filed on Jun. 20, 2006.

TECHNICAL FIELD

The present invention relates generally to wireless communication networks, and in particular to a method for accessing a network by user equipment.

BACKGROUND ART

Universal mobile telecommunications system (UMTS) is a 3rd Generation (3G) asynchronous mobile communication system operating in wideband code division multiple access (WCDMA) based on European systems, global system for mobile communications (GSM) and general packet radio services (GPRS). The long term evolution (LTE) of UMTS is under discussion by the 3rd generation partnership project (3GPP) that standardized UMTS. The 3GPP LTE is a technology for enabling high-speed packet communications. Many schemes have been proposed for the LTE objective including those that aim to reduce user and provider costs, improve service quality, and expand and improve coverage and system capacity. The 3G LTE requires reduced cost per bit, increased service availability, flexible use of a frequency band, a simple structure, an open interface, and adequate power consumption of a terminal as an upper-level requirement.

FIG. 1 is a block diagram illustrating network structure of an evolved universal mobile telecommunication system (E-UMTS). The E-UMTS may be also referred to as an LTE system. The communication network is widely deployed to provide a variety of communication services such as voice and packet data.

As illustrated in FIG. 1, the E-UMTS network includes an evolved UMTS terrestrial radio access network (E-UTRAN) and an Evolved Packet Core (EPC) and one or more user equipment. The E-UTRAN may include one or more evolved NodeB (eNodeB) 20, and a plurality of user equipment (UE) 10 may be located in one cell. One or more E-UTRAN mobility management entity (MME)/system architecture evolution (SAE) gateways 30 may be positioned at the end of the network and connected to an external network.

As used herein, "downlink" refers to communication from eNodeB 20 to UE 10, and "uplink" refers to communication from the UE to an eNodeB. UE 10 refers to communication equipment carried by a user and may be also be referred to as a mobile station (MS), a user terminal (UT), a subscriber station (SS) or a wireless device.

An eNodeB 20 provides end points of a user plane and a control plane to the UE 10. MME/SAE gateway 30 provides an end point of a session and mobility management function for UE 10. The eNodeB and MME/SAE gateway may be connected via an S1 interface.

The eNodeB 20 is generally a fixed station that communicates with a UE 10, and may also be referred to as a base station (BS) or an access point. One eNodeB 20 may be deployed per cell. An interface for transmitting user traffic or control traffic may be used between eNodeBs 20.

The MME provides various functions including distribution of paging messages to eNodeBs 20, security control, idle state mobility control, SAE bearer control, and ciphering and integrity protection of non-access stratum (NAS) signaling. The SAE gateway host provides assorted functions including termination of U-plane packets for paging reasons, and switching of the U-plane to support UE mobility. For clarity MME/SAE gateway 30 will be referred to herein simply as a "gateway," but it is understood that this entity includes both an MME and an SAE gateway.

A plurality of nodes may be connected between eNodeB 20 and gateway 30 via the S1 interface. The eNodeBs 20 may be connected to each other via an X2 interface and neighboring eNodeBs may have a meshed network structure that has the X2 interface.

FIG. 2A is a block diagram depicting architecture of a typical E-UTRAN and a typical EPC. As illustrated, eNodeB 20 may perform functions of selection for gateway 30, routing toward the gateway during a Radio Resource Control (RRC) activation, scheduling and transmitting of paging messages, scheduling and transmitting of Broadcast Channel (BCCH) information, dynamic allocation of resources to UEs 10 in both uplink and downlink, configuration and provisioning of eNodeB measurements, radio bearer control, radio admission control (RAC), and connection mobility control in LTE_ACTIVE state. In the EPC, and as noted above, gateway 30 may perform functions of paging origination, LTE-IDLE state management, ciphering of the user plane, System Architecture Evolution (SAE) bearer control, and ciphering and integrity protection of Non-Access Stratum (NAS) signaling.

FIGS. 2B and 2C are block diagrams depicting the user-plane protocol and the control-plane protocol stack for the E-UMTS. As illustrated, the protocol layers may be divided into a first layer (L1), a second layer (L2) and a third layer (L3) based upon the three lower layers of an open system interconnection (OSI) standard model of communication systems.

The physical layer, the first layer (L1), provides an information transmission service to an upper layer by using a physical channel. The physical layer is connected with a medium access control (MAC) layer located at a higher level through a transport channel, and data between the MAC layer and the physical layer is transferred via the transport channel. Between different physical layers, namely, between physical layers of a transmission side and a reception side, data is transferred via the physical channel.

The MAC layer of Layer 2 (L2) provides services to a radio link control (RLC) layer (which is a higher layer) via a logical channel. The RLC layer of Layer 2 (L2) supports the transmission of data with reliability. It should be noted that the RLC layer illustrated in FIGS. 2(b) and 2(c) is depicted because if the RLC functions are implemented in and performed by the MAC layer, the RLC layer itself is not required. The PDCP layer of Layer 2 (L2) performs a header compression function that reduces unnecessary control information Such that data being transmitted by employing Internet protocol (IP) packets, such as IPv4 or IPv6, can be efficiently sent over a radio (wireless) interface that has a relatively small bandwidth.

A radio resource control (RRC) layer located at the lowest portion of the third layer (L3) is only defined in the control plane and controls logical channels, transport channels and the physical channels in relation to the configuration, reconfiguration, and release of the radio bearers (RBs). Here, the RB signifies a service provided by the second layer (L2) for data transmission between the terminal and the E-UTRAN.

As illustrated in FIG. 2B, the RLC and MAC layers (terminated in an eNodeB 20 on the network side) may perform functions such as Scheduling, Automatic Repeat Request (ARQ), and hybrid automatic repeat request (HARQ). The PDCP layer (terminated in eNodeB 20 on the network side) may perform the user plane functions such as header compression, integrity protection, and ciphering.

As illustrated in FIG. 2C, the RLC and MAC layers (terminated in an eNodeB 20 on the network side) perform the same functions as for the control plane. As illustrated, the RRC layer (terminated in an eNodeB 20 on the network side) may perform functions such as broadcasting, paging, RRC connection management, Radio Bearer (RB) control, mobility functions, and UE measurement reporting and controlling. The NAS control protocol (terminated in the MME of gateway 30 on the network side) may perform functions such as a SAE bearer management, authentication, LTE_IDLE mobility handling, paging origination in LTE_IDLE, and security control for the signaling between the gateway and UE 10.

The NAS control protocol may use three different states; first, a LTE_DETACHED state if there is no RRC entity; second, a LTE_IDLE state if there is no RRC connection while storing minimal UE information; and third, an LTE_ACTIVE state if the RRC connection is established. Also, the RRC state may be divided into two different states such as a RRC_IDLE and a RRC_CONNECTED.

In RRC_IDLE state, the UE 10 may receive broadcasts of system information and paging information while the UE specifies a Discontinuous Reception (DRX) configured by NAS, and the UE has been allocated an identification (ID) which uniquely identifies the UE in a tracking area. Also, in RRC-IDLE state, no RRC context is stored in the eNodeB.

In RRC_CONNECTED state, the UE 10 has an E-UTRAN RRC connection and a context in the E-UTRAN, such that transmitting and/or receiving data to/from the network (eNodeB) becomes possible. Also, the UE 10 can report channel quality information and feedback information to the eNodeB.

In RRC_CONNECTED state, the E-UTRAN knows the cell to which the UE 10 belongs. Therefore, the network can transmit and/or receive data to/from UE 10, the network can control mobility (handover) of the UE, and the network can perform cell measurements for a neighboring cell.

In RRC_IDLE mode, the UE 10 specifies the paging DRX (Discontinuous Reception) cycle. Specifically, the UE 10 monitors a paging signal at a specific paging occasion of every UE specific paging DRX cycle.

DISCLOSURE

Technical Solution

Features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

In accordance with an embodiment, a method for accessing a wireless communication network includes transmitting a first message that has a first random identifier (RAND ID), and receiving a response to the first message such that the response includes the first RAND ID and signaling information. The method further includes transmitting a second message, having a second RAND ID, using at least one allocated resource.

In one feature, the method further includes transmitting uplink data including the second RAND ID.

In another feature, the uplink data further includes identification data which identifies user equipment (UE) performing the transmitting of the uplink data.

In yet another feature, the method further includes receiving a confirmation message confirming successful access to the wireless communication network. Typically, the confirmation message includes the second RAND ID.

In still yet another feature, the method further includes detecting that a confirmation message confirming successful access to the wireless communication network has not been received within a predetermined period of time, and performing the transmitting and receiving operations if confirmation is not detected.

In one aspect, the response includes at least one of an allocated resource and timing advance.

In another aspect, the transmitting of the second message uses a plurality of allocated resources.

In yet another aspect, the first message comprises an access request.

In still yet another aspect, the second message comprises a scheduling request.

In one feature, the first RAND ID is associated with user equipment (UE) transmitting the first RAND ID.

In another aspect, the method further includes selecting the first RAND ID from a first group of RAND IDs, and selecting the second RAND ID from a second group of RAND IDs. In this example, the first group contains a different number of identifiers than the second group.

In accordance with an alternative embodiment, a method for communicating with a UE includes receiving a first message from the UE, such that the first message includes a first RAND ID. The method further includes transmitting to the UE a response to the first message, and receiving a second message from the UE on at least one allocated resource. Typically, the response includes the first RAND ID and signaling information, and the second message comprises a second RAND ID.

These and other embodiments will also become readily apparent to those skilled in the art from the following detailed description of the embodiments having reference to the attached figures, the invention not being limited to any particular embodiment disclosed.

DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. Features, elements, and aspects of the invention that are referenced by the same numerals in different figures represent the same, equivalent, or similar features, elements, or aspects in accordance with one or more embodiments. In the drawings.

BEST MODE FOR CARRYING OUT THE INVENTION

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

Two generalized approaches for a random access procedure will be referred to as a one step approach and a two step approach. In particular, FIG. 2(d) depicts a one step random access procedure, and FIG. 2(e) depicts a two step random access procedure.

Figure 1:
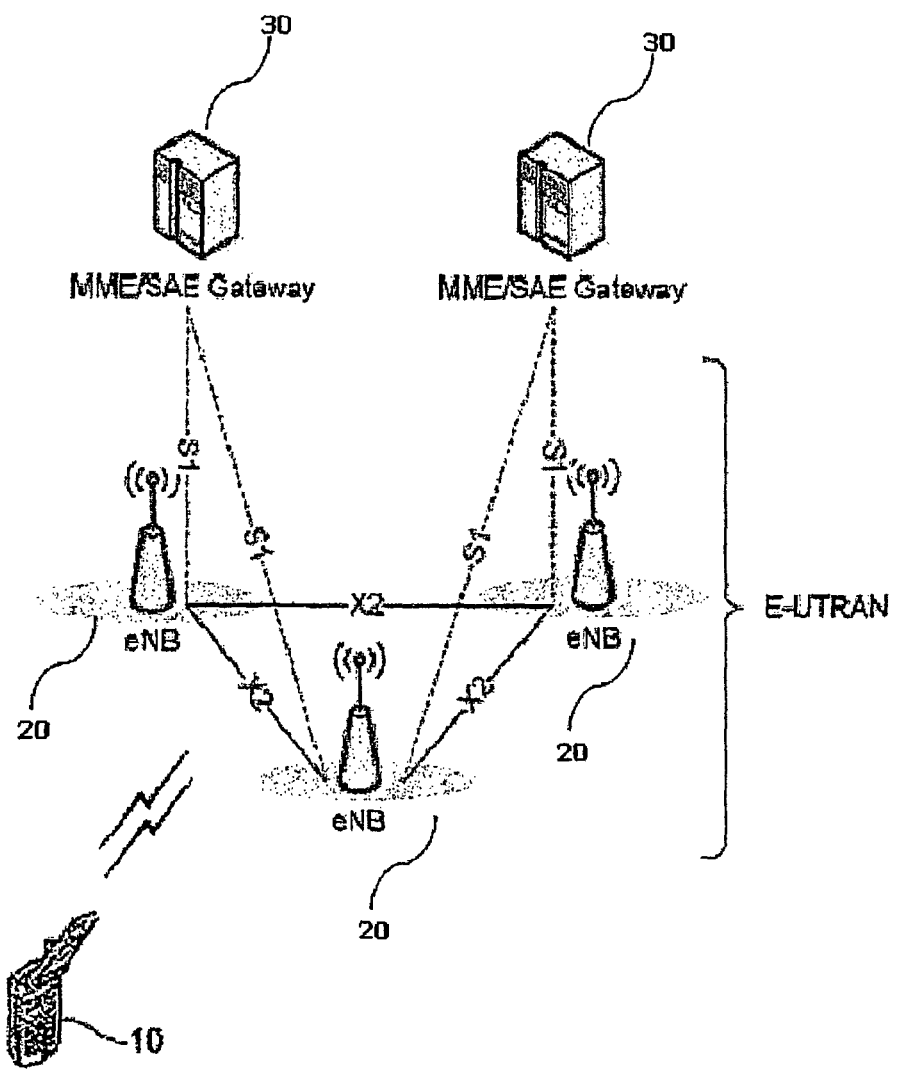
FIG. 1 is a block diagram illustrating a communication network, such as an evolved universal mobile telecommunication system (E-UMTS)
Figure 2A:
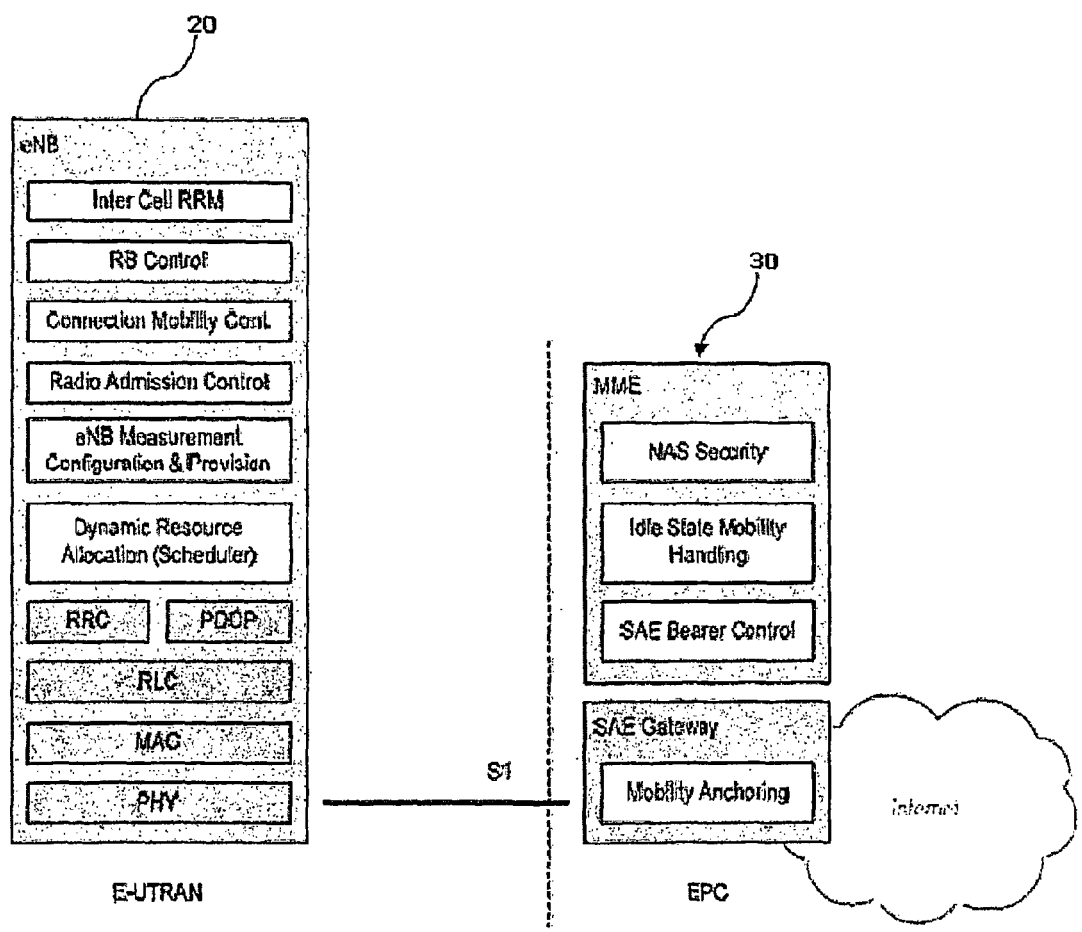
FIG. 2A is a block diagram depicting architecture of a typical E-UTRAN and a typical EPC.
Figure 2B:
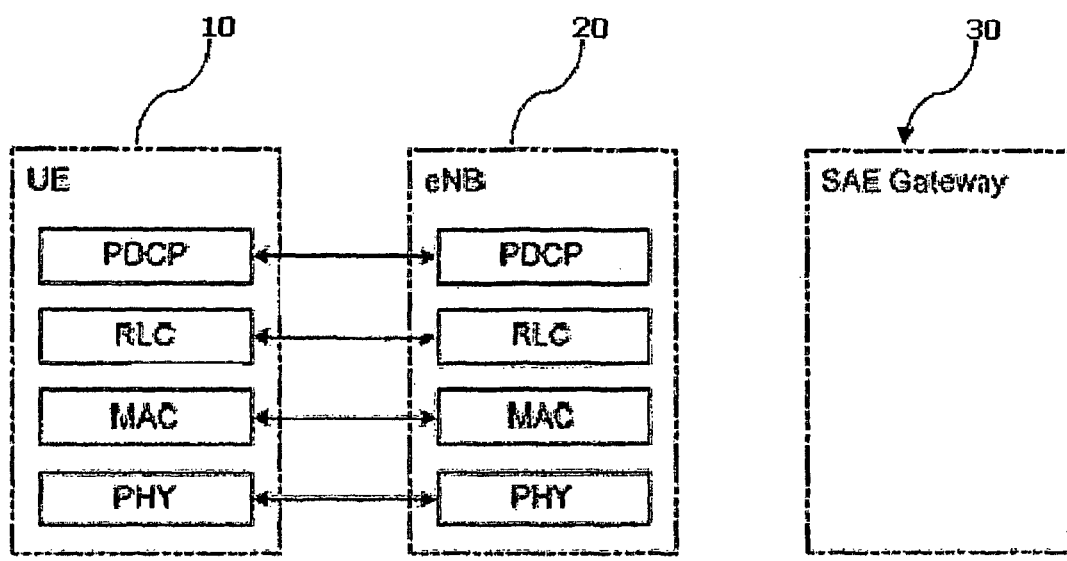
FIG. 2B is a block diagram depicting the user-plane protocol stack for the E-UMTS.
Figure 2C:
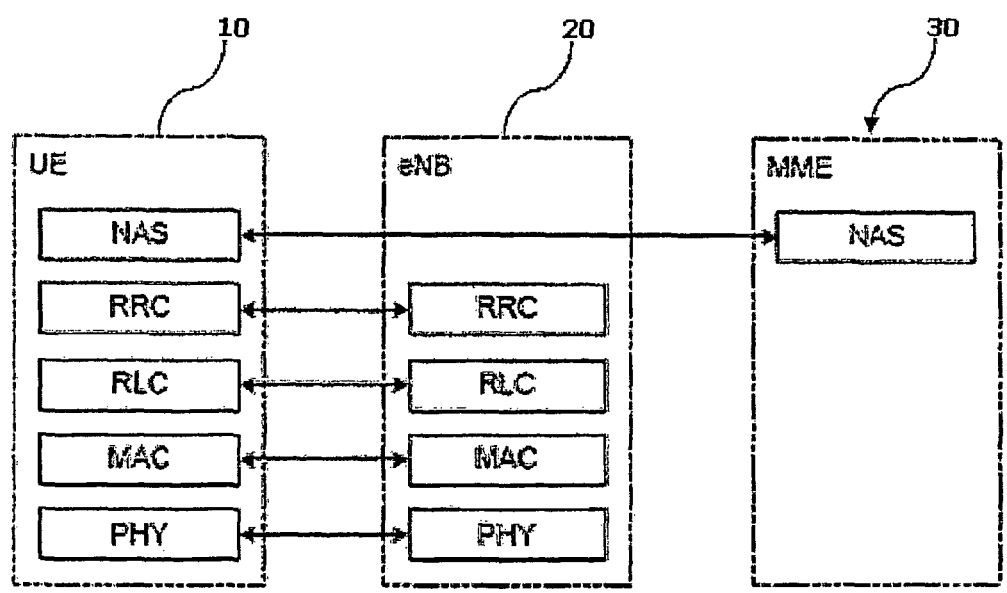
FIG. 2C is a block diagram depicting the control-plane protocol stack for the E-UMTS.
Figure 2D:
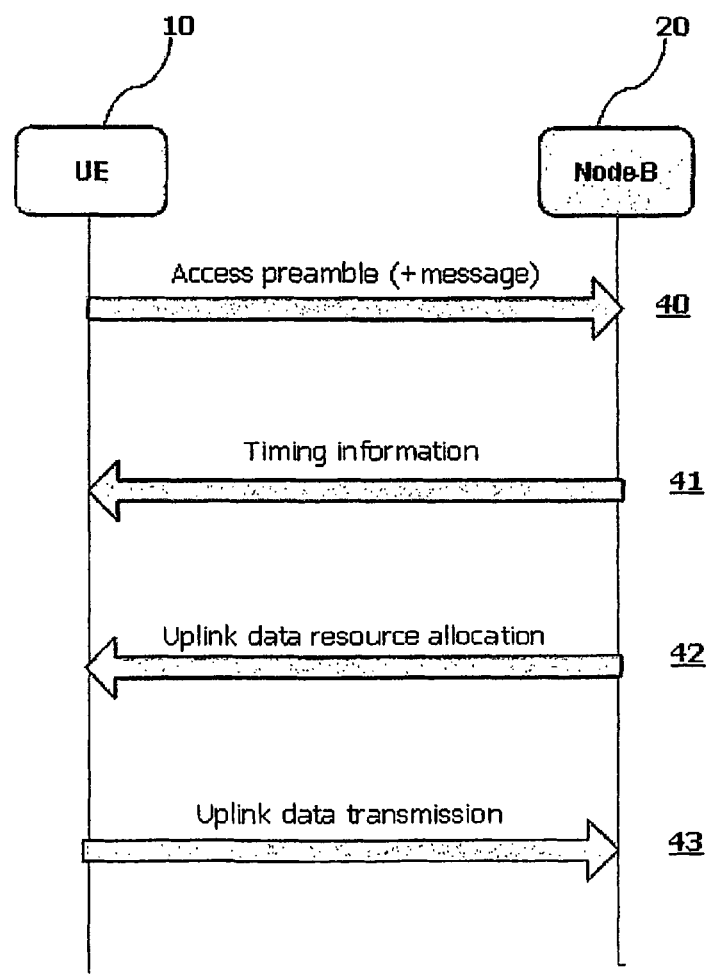
FIG. 2D depicts a one step random access procedure.

Referring first to FIG. 2(d), operation 40 includes transmitting an access preamble and message from the UE to the NodeB. The message may be implicitly transmitted within the preamble sequence. In response, the NodeB transmits timing information to the UE (operation 41). In addition, the NodeB further transmits the resource allocation for which the UE is permitted to use for uplink data transmissions (operation 42). Operation 43 depicts the UE transmitting uplink data using, for example, the resource allocation indicated by the NodeB.

Figure 2E:
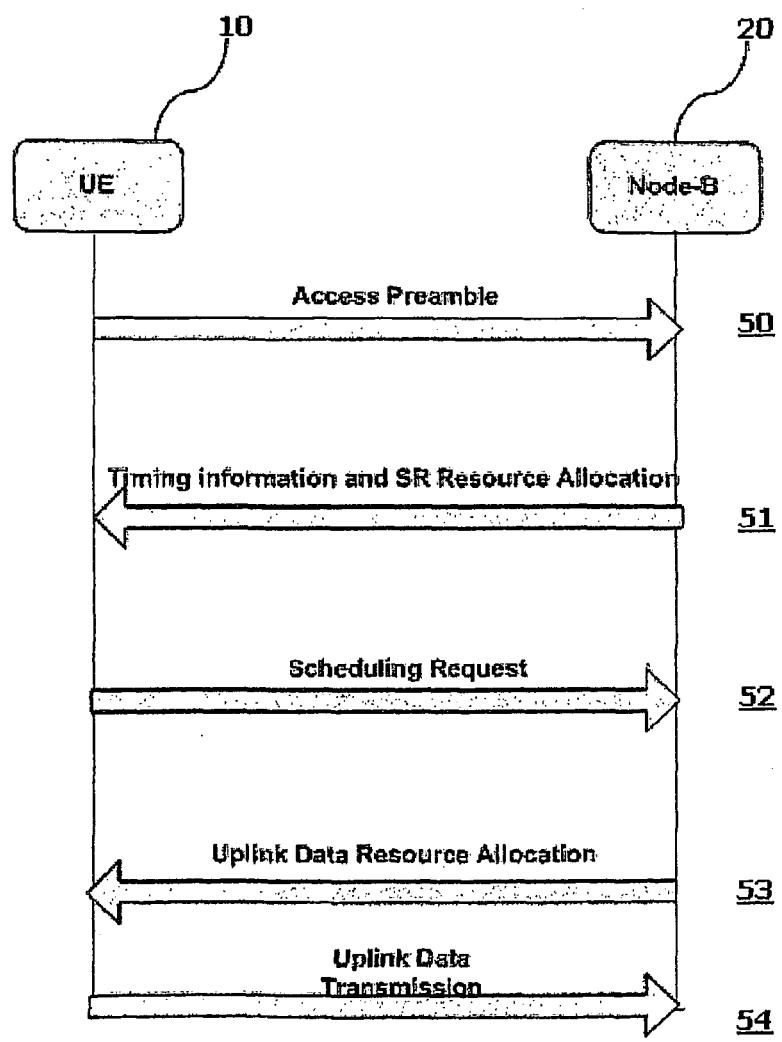
FIG. 2E depicts a two step random access procedure.

The two step random access procedure of FIG. 2(e) includes transmitting an access preamble from the UE to the NodeB (operation 50). In response, the NodeB transmits timing information and a scheduling request resource allocation to the UE (operation 51). Operation 52 includes the UE transmitting a scheduling request to the NodeB. Typically, this transmission utilizes the scheduling request resource allocation indicated by the NodeB in operation 51. Operation 53 includes the NodeB transmitting a data resource allocation for which the UE is permitted to use for uplink data transmissions. Operation 54 depicts the UE transmitting uplink data using, for example, the data resource allocation indicated by the NodeB.

In accordance with various embodiments of the present invention, candidate parameters which may be transmitted within the message bits of the preamble in either of these just-described approaches include the random identifier (RAND ID), downlink channel quality identifier (CQI), establishment cause, and resource request, among others.

A RAND ID allows for the use of different signatures and may be used for collision resolution for both intra cell and inter cell scenarios. Collision probability may be expressed as a function of the allowed number of signatures and the number of random access slots. The random access slot is typically defined in the time and frequency domains. Increasing the number of access slots and signatures results in a decrease of the collision probability. However, this is usually at the expense of resources for data transmission and NodeB complexity.

One possibility includes using a temporary RAND ID as a portion of a number of available message bits (e.g., 4 or 8 bits) of the preamble. A temporary RAND ID may be selected by the UE for transmission in the preamble, and released upon preamble acknowledgement by the network.

A CQI may be used for link adaptation in downlink transmissions. The downlink CQI may have a length of two bits and may also be transmitted with the preamble. In some cases, the downlink CQI may be transmitted using different sets of signatures. In many instances, the downlink CQI is based on receiver performance and pathloss. Open loop power control, for example, may be used to determine the initial transmit power level and is based on pathloss estimation. Therefore, downlink CQI transmission may be avoided by associating the signatures and random access slots with a pathless range.

One purpose of the establishment cause is for early handling of access priority (e.g. emergency situations). The number of establishment causes determine the bit size length; a three bit length is common. Consider the scenario in which the number of establishment causes implemented is the same as that which is implemented in WCDMA. Thus twenty possible establishment causes can be implemented. In such a scenario, four or more bits should be used. It is possible that the establishment cause transmission may be omitted by associating a reserved random access slot and/or signature.

The purpose of a typical resource request is to adjust the resource allocation. This allocation is based upon the needs of the UE for uplink transmission. The size of the resource request will determine whether it is possible to transmit the request implicitly with the preamble. If it is not transmitted, the necessary amount of uplink resources that need to be allocated can be either constant or variable. A constant amount of uplink resources is a situation in which the amount of resources does not vary, regardless of the random access cause. This may result in a waste of uplink resources. On the other hand, the amount of uplink resources may be variable such that the amount is based on the preamble linked to the access cause.

The one step and two step approaches have different capabilities of collision resolution. Three different maechanisms will be considered in view of these approaches. As noted above, collision probability may be generally defined as a function of the allowed number of signatures, and the number of random access slots. It is generally understood that collisions have a high cost in terms of resource consumption (e.g., resource block allocation) and in terms of NodeB complexity. This is because allocating more resource blocks/signatures results in an increase in the number of correlations that need to be performed in the NodeB.

It is desirable to allocate additional signatures for collision resolution since the number of access slots should be minimized if at all possible. The signature and access resources are included in the response message that is sent from the NodeB, and thus, if a collision is detected it can then be resolved.

One technique for resolving inter-cell collisions, for example, is to allocate different signatures/access slots in neighboring cells. Allocating different frequencies/signatures does not typically require time synchronization between NodeBs. However, allocating different time slots will usually require time synchronization between the NodeBs. Other techniques for reducing the probability of inter-cell collisions include restricting the use of the same resources (e.g., signature, access slot, etc.) only for UEs which are located relative to the cell border. An example of this scenario is one in which the UEs have similar pathloss for the best and second best cell.

A UE identification (UE ID) is commonly included in a RRC message. Examples of such identifications include international mobile subscriber identity (IMSI), temporary IMSI (T-IMSI), UTRAN radio network temporary identity (U-RNTI), and the like. For uplink data transmissions, the UE ID may be used to resolve an undetected collision. The UE ID may also be included in the response message. Thus any collision of the transmission of the uplink RRC message may be resolved at that time. However, if a collision occurs, the resources for the uplink data transmission are effectively wasted because the transmission of the RRC messages and the delay induced by this detection (based on a RRC timer) is high.

Consider the situation in which segmentation and/or HARQ are used for the transmission of the uplink data, along with the MAC-ID. In this case, the UE already includes a unique ID (MAC-ID) which has been allocated by an earlier transaction, and this unique ID can be used for conflict resolution.

In order to increase the speed of the collision resolution process, a two step approach permits an additional mechanism for collision resolution by adding a second RAND ID to the scheduling request message, for example. If the UE has been allocated a valid MAC-ID after transmitting the scheduling request message, any collision that has not been resolved using the first RAND ID (e.g., located in the access preamble) may be resolved by including the MAC-ID in the scheduling request message. Alternatively, if the UE has not been allocated a valid MAC-ID, the UE may be configured to select a second RAND ID for transmitting along with the scheduling request message. This approach will likely increase the chances that a non-resolved collision will be resolved after the transmission of the scheduling request message.

In an embodiment, the UE is configured to select a random identifier (e.g., a reserved number of MAC-IDs that are broadcast in system information) for transmitting along with the scheduling request message.

A delay analysis will now be explored with regard to both the one step and two step procedures. Considering first a one step procedure, the delay may depend on the number of times that the UE has to send the preamble in order to be detected, such as that which is depicted in the following:

$$T_{Preamble} = a * t_{\Delta Preamble}$$

where a is the average number of preambles during the power ramping.

In the NodeB, additional time for resource allocation and the indication of resources is likely to be required, and will be referred to as:

$$T_{ResourceAlloc}.$$

The time necessary for the transmission of the uplink message using HARQ, depending on the number of retransmissions, is as follows:

$$T_{Message} = b * t_{\Delta Message}$$

where b is the average number of HARQ transmissions.

The total time for a successful transmission may be represented as follows:

$$T_{1step} = T_{Preamble} + T_{ResourceAlloc} + T_{Message} = a * t_{\Delta Preamble} + T_{ResourceAlloc} + b * t_{\Delta Message}.$$

An exemplary two step procedure will now be considered. In this approach, an additional delay is added to the delay of the one step procedure. This additional delay is for delaying the transmission of the scheduling request, such as illustrated in the following:

$$T_{2step} = a * t_{\Delta Preamble} + T_{Scheduling\ Request} + T_{ResourceAlloc} + b * t_{\Delta Message}$$

It is estimated that all of the delays are substantially equal. Such delays are as follows:

$t_{\Delta Preamble}$,
$t_{\Delta Message}$,
$T_{Scheduling\ Request}$,
$T_{ResourceAlloc}$.

One difference between the one step and the two steps approaches relates to the ratio between:

$2+a+b/1+a+b$.

Consider the situation of an unsuccessful transmission such that there is a collision of the preamble. In a one step approach, the collision will typically only be detected after the UE realizes that it has not yet received an answer on the uplink RRC message (e.g., expiration of a timer). On the other hand, in the two step approach, collisions may be detected after the transmission of the scheduling request message. Such detection may be accomplished via a second random ID, for example. Such an approach will now be described.

Figure 3:
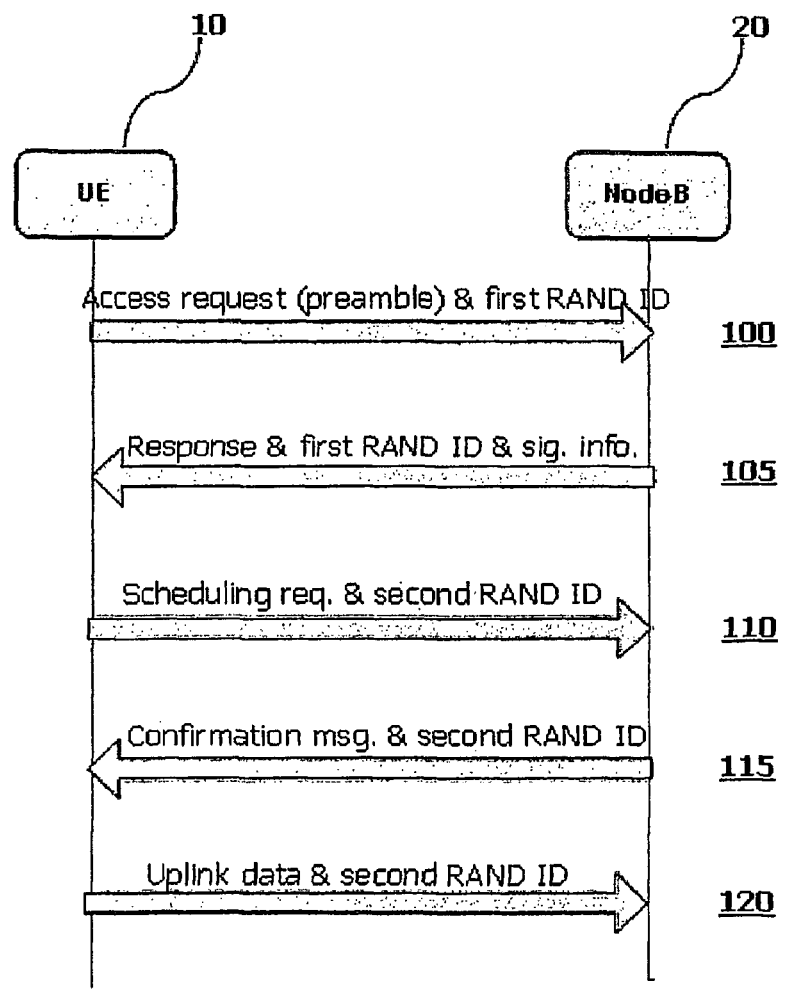
FIG. 3 depicts a method for accessing a wireless communication network according to an embodiment of the present invention.

FIG. 3 depicts a method for accessing a wireless communication network according to an embodiment of the present invention. Operation 100 includes transmitting a first message by the UE to the NodeB. The first message, which may be implemented as an access request, typically includes a first random identifier (RAND ID). In an embodiment, the first RAND ID includes a random signature or an identifier associated with the UE.

During this operation the UE may also select the access slot among a set of access slots available for the pathloss that the UE measures. The selection of the access slot may be performed on the cell to be accessed, as well as for neighboring cells. The selection operation is typically performed based upon received system information.

Operation 105 includes receiving at the UE a response to the first message. The response is transmitted by the NodeB responsive to receiving the first message and typically includes the first RAND ID and signaling information. It is notable that the first RAND ID, which is received by the UE, is the same RAND ID which was transmitted by the UE in operation 100. The received response of operation 105 may further include an indication of the access slot, along with acknowledgement (ACK)/non-acknowledgement (NACK) information to indicate the error status of the received first message.

If the response includes an ACK, the NodeB may also indicate one or more resources for the UE, which facilitates the UE sending a scheduling request. If the response includes a NACK or the NodeB otherwise does not receive the response, the UE may be configured to retransmit the first message after a predetermined time period.

Operation 110 relates to transmitting a second message from the UE to the NodeB using the allocated resource or resources. This second message, which may be implemented using a scheduling request, includes a second RAND ID. It is possible that several UEs have chosen the same random identifier (e.g., first RAND ID). In such a scenario, a collision may nevertheless be resolved because of this second RAND ID.

Operation 115 includes receiving a confirmation message confirming successful access to the wireless communication network by the UE. If desired, the confirmation message includes the second RAND ID and indicates the allocated uplink resources for which the UE is permitted to use. The confirmation message is an example of the NodeB acknowledging receipt of the scheduling request described in operation 110.

The situation may arise in which the UE has detected that a confirmation message confirming successful access to the wireless communication network has not been received within a predetermined period of time, for example. In such a case, operations 100 through 110 may be repeated until such confirmation is detected.

Operation 120 includes transmitting uplink data, which includes the second RAND ID among other data, using one or more allocated uplink resources. This operation permits the NodeB to confirm the allocation of the resources.

Several points with regard to the one step and two step approaches are noted. First, the one step technique generally has a shorter delay as compared to the two step approach. The difference typically depends on the average number of preamble transmissions and HARQ transmissions. When there is a preamble collision, the one step approach will typically have higher delay as compared to the two step approach. The one step approach also has a higher need for random identifiers and resources for the preamble. It is further notable that the two step approach has a lower number of erroneous allocations of the shared uplink channels.

Selecting between the one step and two step approaches includes consideration of the trade off between factors such as the latency of the successful and unsuccessful case, resource optimization, and collision resolution. The one step approach generally requires a shorter delay to transmit uplink data. However, due to the restricted amount of data available in the preamble, it is generally understood that it is preferable to transmit the pathloss and a maximum number of random identifications in the preamble/access slots. This consequently minimizes the space for the resource request. The two step approach minimizes or eliminates some or all of these aspects of the one step approach, and thus, may be the preferred implementation in many situations.

Figure 4:
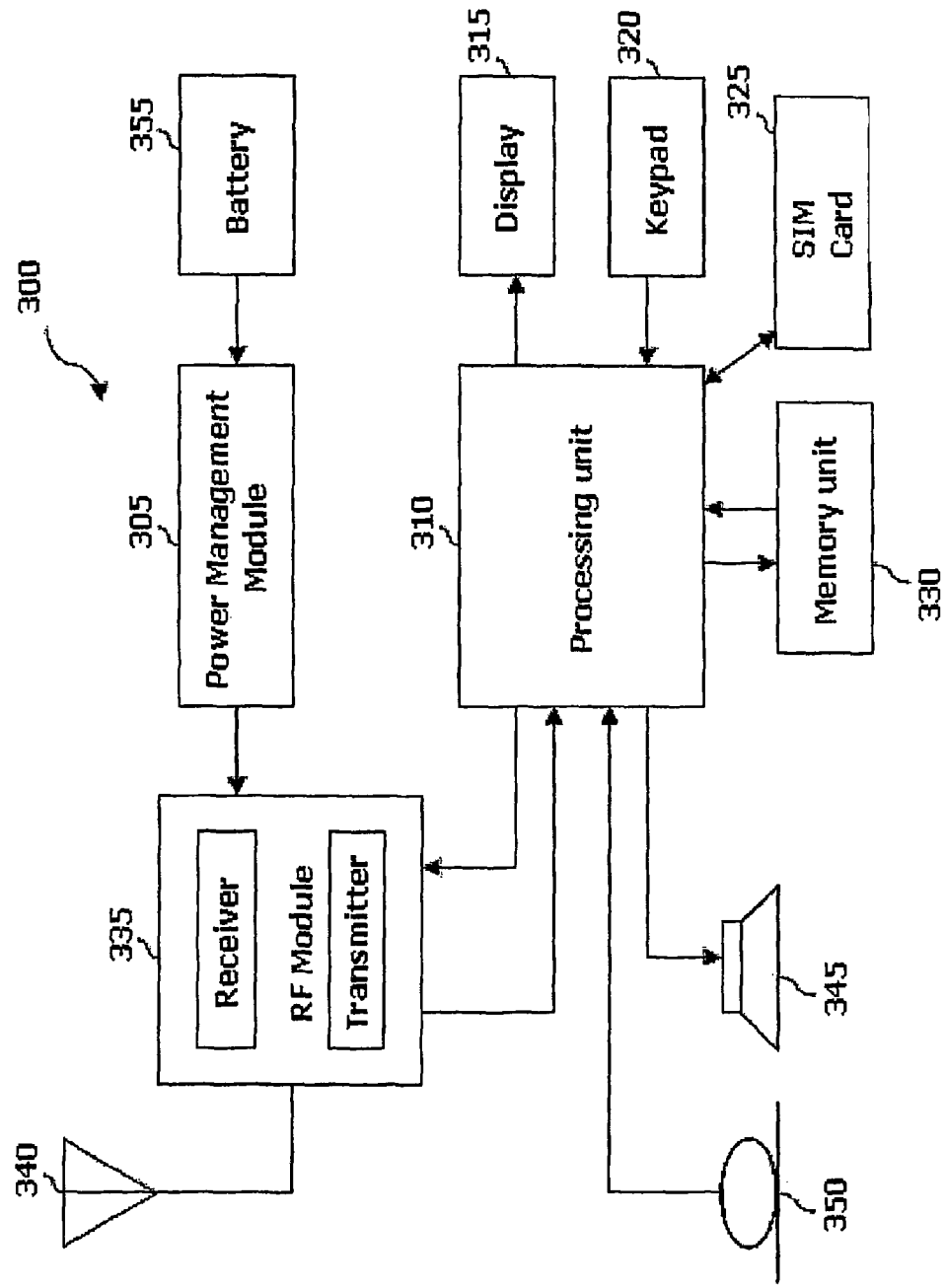
FIG. 4 is a block diagram of a mobile communication terminal.

FIG. 4 is a block diagram of mobile communication device 300, which may be configured as a UE in accordance with embodiments of the present invention. Device 300 is illustrated, for example, as a mobile phone and may be configured to perform various methods described herein. The mobile communication device 300 includes a processing unit 310 such as a microprocessor or digital signal processor, RF module 335, power management module 305, antenna 340, battery 355, display 315, keypad 320, optional subscriber identify module (SIM) card 325, memory unit 330 such as flash memory, ROM or SRAM, speaker 345 and microphone 350.

A user enters instructional information, such as a telephone number, for example, by pushing the buttons of keypad 320 or by voice activation using microphone 350. Processing unit 310 receives and processes the instructional information to perform the appropriate function, such as to dial the telephone number. Operational data may be retrieved from memory unit 330 to perform the function. Furthermore, processing unit 310 may display the instructional and operational information on display 315 for the user's reference and convenience.

Processing unit 310 issues instructional information to RF section 335, to initiate communication, for example, transmit radio signals comprising voice communication data. RF section 335 comprises a receiver and a transmitter to receive and transmit radio signals. Antenna 340 facilitates the transmission and reception of radio signals. Upon receiving radio signals, RF module 335 may forward and convert the signals to baseband frequency for processing by processing unit 310. The processed signals would be transformed into audible or readable information outputted via speaker 345, for example.

Processing unit 310 is adapted to perform various methods disclosed herein, among other operation. It will be apparent to one skilled in the art that mobile communication device 300 may be readily implemented using, for example, processing unit 310 or other data or digital processing device, either alone or in combination with external support logic. Although the present invention is described in the context of mobile communication, the present invention may also be used in any wireless communication systems using mobile devices, such as PDAs and laptop computers equipped with wireless communication capabilities. Moreover, the use of certain terms to describe the present invention should not limit the scope of the present invention to certain type of wireless communication system, such as UMTS. The present invention is also applicable to other wireless communication systems using different air interfaces and/or physical layers, for example, TDMA, CDMA, FDMA, WCDMA, and the like.

The preferred embodiments may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Field Programmable Gate Array (FPGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor.

The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present invention, and that the article of manufacture may comprise any information bearing medium known in the art.

The logic implementation shown in the figures described specific operations as occurring in a particular order. In alternative implementations, certain logic operations may be performed in a different order, modified or removed and still implement preferred embodiments of the present invention. Moreover, steps may be added to the above described logic and still conform to implementations of the invention.

The foregoing embodiments and advantages are merely exemplary and are not to be construed as limiting the present invention. The present teaching can be readily applied to other types of apparatuses and processes. The description of the present invention is intended to be illustrative, and not to limit the scope of the claims. Many alternatives, modifications, and variations will be apparent to those skilled in the art.

The invention claimed is:

1. A method for accessing a wireless communication network, the method comprising:
   transmitting an access request message comprising a first random identifier (RAND ID);
   receiving a response to the access request message, the response comprising the first RAND ID and signaling information indicating a scheduling request resource allocation;
   transmitting a scheduling request message according to the signaling information upon receiving the response, the scheduling request message comprising a second RAND ID;

determining whether a confirmation message is received within a predetermined period of time in response to the scheduling request message, the confirmation message comprising the second RAND ID and confirming successful access to the wireless communication network; and automatically repeating the operations of transmitting the access request message, receiving the response to the access request message, and transmitting the scheduling request message according to the signaling information upon receiving the response if it is determined that the confirmation message has not been received within the predetermined period of time.

2. The method according to claim 1, further comprising: transmitting uplink data comprising the second RAND ID.

3. The method according to claim 2, wherein the uplink data further comprises identification data which identifies user equipment (UE) performing the transmitting of the uplink data.

4. The method according to claim 1, wherein the response further comprises a timing advance.

5. The method according to claim 1, wherein transmitting the scheduling request message uses a plurality of allocated resources.

6. The method according to claim 1, wherein the first RAND ID is associated with a user equipment (UE) transmitting the access request message.

7. The method according to claim 1, further comprising:
selecting the first RAND ID from a first group of RAND IDs; and
selecting the second RAND ID from a second group of RAND IDs,
wherein the first group contains a different number of RAND IDs than the second group.

8. A method for communicating with a user equipment (UE), the method comprising:
receiving an access request message comprising a first random identifier (RAND ID);
transmitting a response to the access request message, the response comprising the first RAND ID and signaling information indicating a scheduling request allocation;
determining whether a scheduling request message is received according to the scheduling information within a predetermined period of time after transmitting the response, the scheduling request message comprising a second RAND ID;
transmitting a confirmation message in response to the scheduling request message if the scheduling request message is received within the predetermined period of time, the confirmation message comprising the second RAND ID and confirming successful access to the wireless communication network and
automatically repeating the operations of receiving the access request message, transmitting the response to the access request message, and determining whether the scheduling request message is received if it is determined that the confirmation message has not been received within the predetermined period of time.

9. The method according to claim 8, further comprising: receiving uplink data comprising the second RAND ID.

10. The method according to claim 9, wherein the uplink data further comprises identification data which identifies the UE.

11. The method according to claim 8, wherein the response further comprises a timing advance.

12. The method according to claim 8, wherein the first RAND ID is associated with the user equipment (UE) transmitting the access request message.

13. The method according to claim 8, further comprising:
selecting the first RAND ID from a first group of RAND IDs; and
selecting the second RAND ID from a second group of RAND IDs,
wherein the first group contains a different number of RAND IDs than the second group.

* * * * *